(12) United States Patent
Toillon et al.

(10) Patent No.: US 12,150,174 B2
(45) Date of Patent: Nov. 19, 2024

(54) METHOD AND DEVICE FOR TRANSMITTING DATA IN A WIRELESS NETWORK

(71) Applicant: SAFRAN ELECTRONICS & DEFENSE, Paris (FR)

(72) Inventors: Patrice Toillon, Paris (FR); Thiebault Jeandon, Paris (FR); Cédric Moreau, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 340 days.

(21) Appl. No.: 17/633,741

(22) PCT Filed: Aug. 19, 2020

(86) PCT No.: PCT/EP2020/073177
§ 371 (c)(1),
(2) Date: Feb. 8, 2022

(87) PCT Pub. No.: WO2021/037625
PCT Pub. Date: Mar. 4, 2021

(65) Prior Publication Data
US 2022/0400518 A1    Dec. 15, 2022

(30) Foreign Application Priority Data
Aug. 30, 2019  (FR) ..................... 1909558

(51) Int. Cl.
*H04B 7/185* (2006.01)
*H04W 74/0816* (2024.01)
(52) U.S. Cl.
CPC .... *H04W 74/0816* (2013.01); *H04B 7/18506* (2013.01)

(58) Field of Classification Search
CPC ............ H04W 74/0816; H04W 84/12; H04W 74/085; H04W 24/02; G06F 11/076; H04L 12/413; H04L 47/10
See application file for complete search history.

(56) References Cited

U.S. PATENT DOCUMENTS 8,873,532 B2 * 10/2014 Kwon ..................... H04W 8/30
370/343
2016/0150534 A1 * 5/2016 Kwon ............... H04W 72/0446
370/338

(Continued)

FOREIGN PATENT DOCUMENTS

EP        2 568 760 A2      3/2013
WO      2013/166726 A1    11/2013

OTHER PUBLICATIONS

Sep. 15, 2020 International Search Report issued in International Patent Application No. PCT/EP2020/073177.

(Continued)

*Primary Examiner* — Khalid W Shaheed
(74) *Attorney, Agent, or Firm* — Williams Mullen; R. Brian Drozd

(57) ABSTRACT

A method and a system for transmitting data in a carrier sense multiple access wireless network wherein a plurality of data transmission devices send respectively at least one data frame at different moments from each other. Each transmission device, when it is initialised: loads the final value of a first, second and third counter, triggers the second counter as from its initial value, triggers, when the second counter has arrived at its final value, the first, triggers, when the first counter has arrived at its final value, the third counter, which is reinitialised to its initial value and retriggered whenever the presence of data is detected on the radio (Continued)

medium, transfers at least one data frame when the third counter has arrived at its final value.

11 Claims, 5 Drawing Sheets

(56) References Cited

U.S. PATENT DOCUMENTS

2017/0079068 A1* 3/2017 Ahmed ............. H04W 74/0816
2019/0342798 A1* 11/2019 Raghothaman ..... H04W 72/542
2021/0168861 A1* 6/2021 Lee ....................... H04W 72/02

OTHER PUBLICATIONS

Sep. 15, 2020 Written Opinion issued in International Patent Application No. PCT/EP2020/073177.
Mersch, Steffen et al., "Coexistence of Wireless Avionics Intra-Communication Networks," 2018 6th IEEE International Conference on Wireless for Space and Extreme Environments (WISEE), IEEE, pp. 18-23, Dec. 11, 2018.

* cited by examiner

METHOD AND DEVICE FOR TRANSMITTING DATA IN A WIRELESS NETWORK

TECHNICAL FIELD

The present invention relates to a method and a device for transmitting data in a carrier sense multiple access wireless network.

PRIOR ART

Transmitting data in a wireless network using the Carrier Sense Multiple Access (CSMA) technique manages the access to the medium of the wireless network by checking that the medium is available before beginning to send a data frame. CSMA makes it possible to detect or to avoid collisions of messages in the transmissions.

Unlike cable networks, first and second data transmission devices may send to a third transmission device without detecting each other, for example when the first and second data transmission devices are out of range of each other.

In the avionics field, work is being carried out to replace or supplement the cable networks of an aircraft using the radio medium as a means of communication between the components of the aircraft. Wireless avionic communications (Wireless Avionics Intra-Communications WAIC) allow exchanges of data in the aircraft as well as to the outside of the aircraft. In the context of avionic communication systems in the WAIC category, beyond the choice of the radio-frequency range currently adopted (4.2 GHz-4.4 GHz), there are at the present time no exchange protocols between equipment meeting a standardised definition. The associated standards to which WAIC refers, by way of appendix only, are IEEE 802.11 (WiFi) and 802.15 (ZigBee).

These protocols find it difficult to meet, or do not meet at all, the constraints of critical on-board systems, in particular determinism, by procuring a temporal organisation of exchanges guaranteeing exclusivity of transmissions and distributed timeliness of transmissions while ensuring a high level of availability of the radio medium.

DISCLOSURE OF THE INVENTION

The aim of the present invention is to solve the drawbacks of the prior art by proposing a system and a method for transmitting data in a carrier sense multiple access wireless network that makes it possible to avoid collisions of data frames arising and that can adapt to variations in the number of data transmission devices.

For this purpose, according to a first aspect, the invention proposes a method for transmitting data in a carrier sense multiple access wireless network wherein a plurality of data transmission devices respectively send at least one data frame at different moments from each other, characterised in that the method comprises the steps, performed by each transmission device when said transmission device is initialised, of:
loading the final value of a first counter, the final value of a second counter and the final value of a third counter, the final value of the first counter being identical for all the data transmission devices, the final value of the second counter being identical for all the data transmission devices and the final value of the third counter being different from each final value of the third counter of the other data transmission devices, the first, second and third counters having an initial value;
triggering the second counter as from its initial value, the second counter being reinitialised to its initial value,
when the second counter has arrived at its final value, triggering the first counter as from its initial value, the first counter being forced to its final value whenever the presence of data is detected on the medium if the second counter has arrived at its final value,
when the first counter has arrived at its final value, triggering the third counter as from its initial value, the third counter being reinitialised to its initial value and retriggered whenever the presence of data is detected on the radio medium,
transferring at least one data frame, when the first counter has arrived at its final value, and triggering the first counter as from its initial value.

The invention also relates to a system for transmitting data in a carrier sense multiple access wireless network wherein a plurality of data transmission devices respectively send at least one data frame at different moments from each other, characterised in that each device comprises means, used when said transmission device is initialised, for:
loading the final value of a first counter, the final value of a second counter and the final value of a third counter, the final value of the first counter being identical for all the data transmission devices, the final value of the second counter being identical for all the data transmission devices and the final value of the third counter being different from each final value of the third counter of the other data transmission devices, the first, second and third counters having an initial value;
triggering the second counter as from its initial value, the second counter being reinitialised to its initial value,
when the second counter has arrived at its final value, triggering the first counter as from its initial value, the first counter being forced to its final value whenever the presence of data is detected on the medium if the second counter has arrived at its final value,
when the first counter has arrived at its final value, triggering the third counter as from its initial value, the third counter being reinitialised to its initial value and retriggered whenever the presence of data is detected on the radio medium,
transferring at least one data frame, when the third counter has arrived at its final value, and triggering of the first counter as from its initial value.

Thus the first counter gives the recurrence of the transmissions of the transmission devices or value of the main cycle of the transmissions in accordance with the regular time planning, the second counter gives the systematic waiting time common to all the transmission devices allowing rephasing thereof or global synchronisation by means of a value higher than the final value of the third counter T3, and the third counter gives the waiting time specific to each transmission device making it possible to distinguish them and to exclude them by means, at each cycle, of a rephasing or a synchronisation.

According to a particular embodiment of the invention, after initialisation, each transmission device:
triggers the second counter as from its initial value, the second counter being reinitialised to its initial value,
when the second counter has arrived at its final value, triggers the third counter as from its initial value, the third counter being reinitialised to its initial value and retriggered whenever the presence of data is detected on the radio medium, transfers at least one data frame, when the third counter has arrived at its final value, and triggering of the first counter as from its initial value, the first counter being forced to its final value whenever the presence of data is detected on the medium during the counting by the third counter.

Awaiting the arrival of the second counter at its final value thus allows rephasing of all the transmission devices. Non-activity on the radio medium during the second final value strictly greater than any value of the third final value.

According to a particular embodiment of the invention, each data transmission device is associated with an item of equipment and at least one transferred frame comes from the item of equipment associated with the transmission device and/or at least one transferred frame was previously transferred by at least one other data transmission device.

Thus the present invention makes it possible to extend the range of the signals transmitted by other data transmission devices and to improve the availability of the radio medium for, for example, frames predefined by configuration.

According to a particular embodiment of the invention, the final value of the second counter is higher than the maximum value that the final value of each third counter can take.

According to a particular embodiment of the invention, the first final value is higher than the sum for i=1 to N of the transmission times of the frames plus the sum for i=1 to N of the final values of the third counters T3 plus the second final value, where N is the maximum number of data transmission devices.

According to a particular embodiment of the invention, the data transmission devices are included in an aircraft.

The invention also relates to the computer programs stored on an information carrier, said programs comprising instructions for implementing the previously described methods, when they are loaded into and executed by a computer system.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
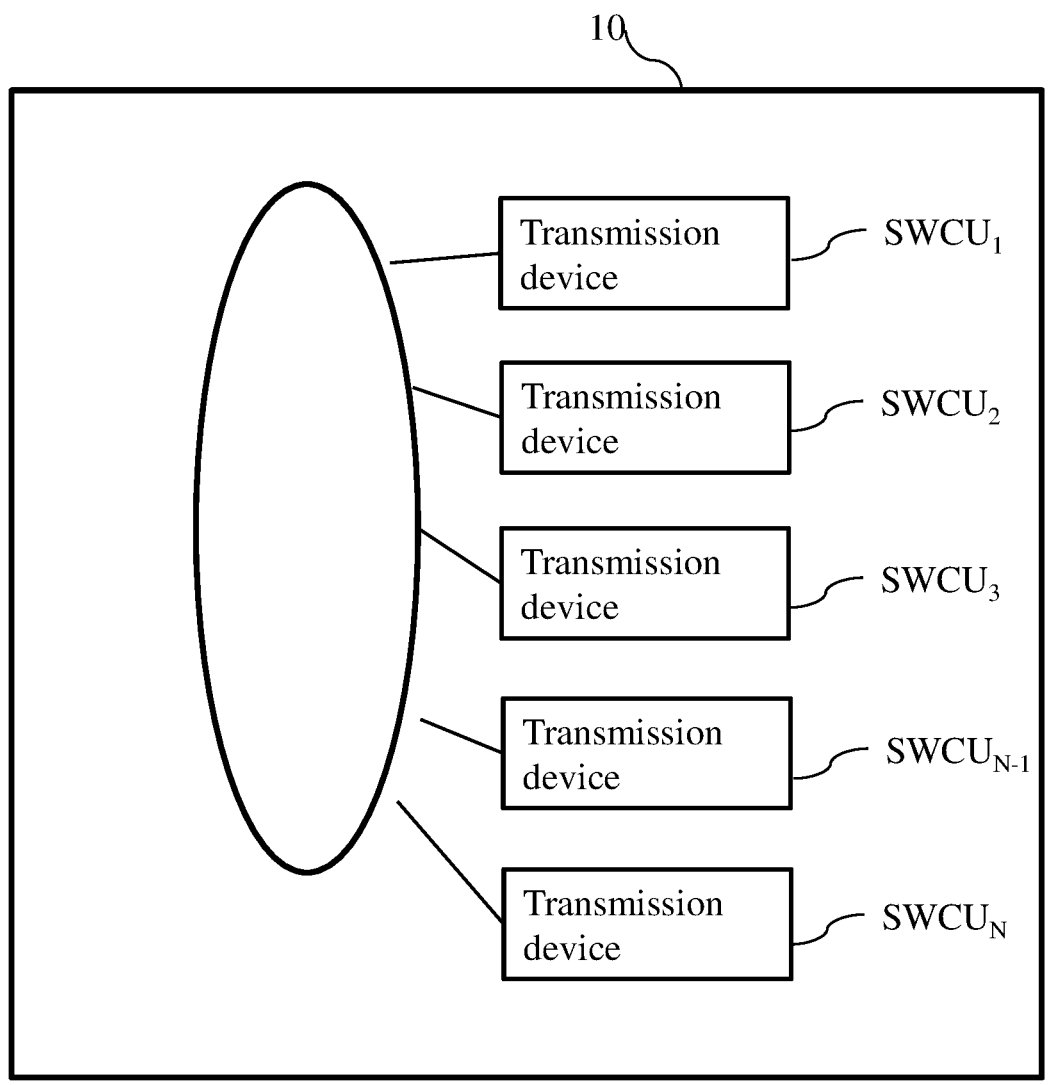
FIG. 1 shows the architecture of a wireless communication network included in an aircraft wherein the present invention is implemented.

FIG. 1 shows the architecture of a wireless communication network included in an aircraft wherein the present invention is implemented.

In FIG. 1, an aircraft 10 comprises a wireless communication network of the WAIC type that comprises data transmission devices denoted $SWCU_1$ to $SWCU_N$. Each data transmission device $SWCU_1$ to $SWCU_N$ is associated with an item of equipment such as a computer, a computing device or a sensor.

The computers and the computing devices are disposed in the aircraft 10 and the sensors are placed at various points inside and outside the structure of the aircraft 10. The sensors placed outside the structure of the aircraft 10 collect data relating to one or more landing devices, to the fuselage of the aircraft, to structural soundness, to the temperature, to the pressures, humidity, corrosion, proximity, to the position of at least one wheel for steering control, to the engine parameter for monitoring and control of the engine, to the detection of frost, to tyre pressure, to the temperature of the tyres and brakes, to the detection of a hard landing, to the baggage compartment data, to the data relating to the hold doors and to the external imaging.

The sensors placed inside the aircraft 10 collect data relating to one or more of the following factors: cabin pressure, smoke, monitoring of objects related to the safety of passengers and crew (for example life jackets and extinguishers), fuel tank, passenger doors, cargo doors, panels, valves and other mechanical moving parts, control of emergency lighting, control of the aircraft lighting, cockpit and cabin crew voices, fixed images of the cabin crew and of the cabin, flight-deck crew and cabin crew movement video, digital data relating to the flight operations.

The wireless network uses for example the frequency band 4.2 GHz-4.4 GHz using the carrier sense multiple access technique.

Each data transmission device checks, using data reception means, that the medium is available before beginning to send a data frame. Thus the decision to send a data frame is made in a decentralised manner.

According to the present invention, each data transmission device, when said transmission device is initialised:
loads the final value of a first counter, the final value of a second counter and the final value of a third counter, the final value of the first counter being identical for all the data transmission devices, the final value of the second counter being identical for all the data transmission devices and the final value of the third counter being different from each final value of the third counter of the other data transmission devices, the first, second and third counters having an initial value;
triggers the second counter as from its initial value, the second counter being reinitialised to its initial value,
when the second counter has arrived at its final value, triggers the first counter as from its initial value, the first counter being forced to its final value whenever the presence of data is detected on the medium if the second counter has arrived at its final value,
when the first counter has arrived at its final value, triggers the third counter as from its initial value, the third counter being reinitialised to its initial value and retriggered whenever the presence of data is detected on the radio medium,
transfers at least one data frame, when the third counter has arrived at its final value, and triggers the first counter as from its initial value.

After the initialisation, each transmission device:
triggers the second counter as from its initial value, the second counter being reinitialised to its initial value,
when the second counter has arrived at its final value, triggers the third counter as from its initial value, the third counter being reinitialised to its initial value and retriggered whenever the presence of data is detected on the radio medium, transfers at least one data frame, when the third counter has arrived at its final value, and triggering of the first counter as from its initial value, the first counter being forced to its final value whenever the presence of data is detected on the medium during the counting by the third counter.

Figure 2:
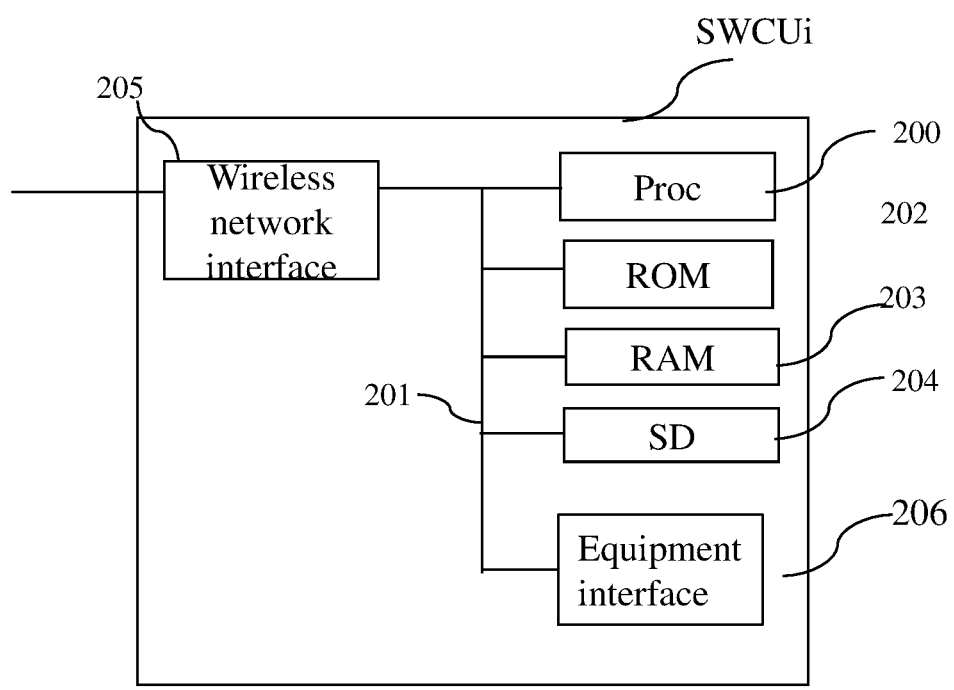
FIG. 2 shows an example of architecture of a data transmission device in a carrier sense multiple access wireless network wherein the present invention is implemented.

FIG. 2 shows an example of data transmission architecture wherein the present invention is implemented.

Each data transmission device $SWCU_i$, with i=1 to N, comprises:
- a processor, microprocessor or microcontroller 200;
- a volatile memory 203;
- a non-volatile memory 202;
- optionally, a storage medium reader 204 such as an SD card (Secure Digital card) reader or a hard disk;
- a wireless network interface 205 for sending data in accordance with the invention, for detecting the presence of data on the radio medium and for receiving data;
- an interface 206 connecting it to equipment such as a computer, a data processing device or a sensor;
- a communication bus 201 connecting the processor 200 to the ROM memory 202, to the RAM memory 203, to the storage medium reader 204, to the wireless network interface 205 and to the interface 206.

The processor 200 is capable of executing instructions loaded in the volatile memory 203 from the non-volatile memory 202, from an external memory (not shown), from a storage medium such as an SD card or the like, or from a communication network. When the data transmission device is powered up, the processor 200 is capable of reading instructions from the volatile memory 203 and executing them. These instructions form a computer program that causes the implementation, by the processor 200, of all or part of the method described in relation to FIGS. 3 to 5.

Figure 3:
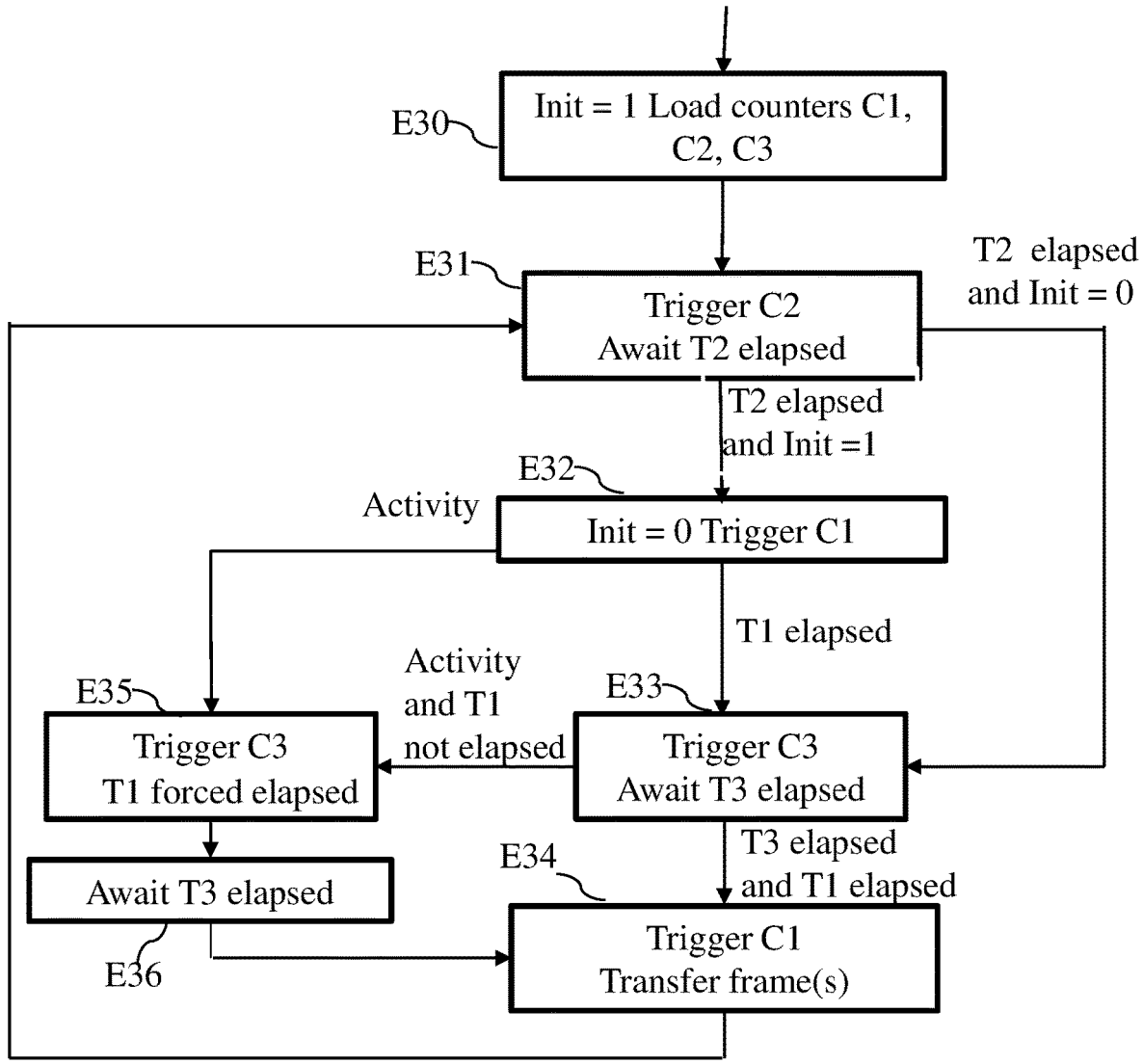
FIG. 3 shows an example of a state diagram of an algorithm executed by each data transmission device according to the present invention.
Figure 4:
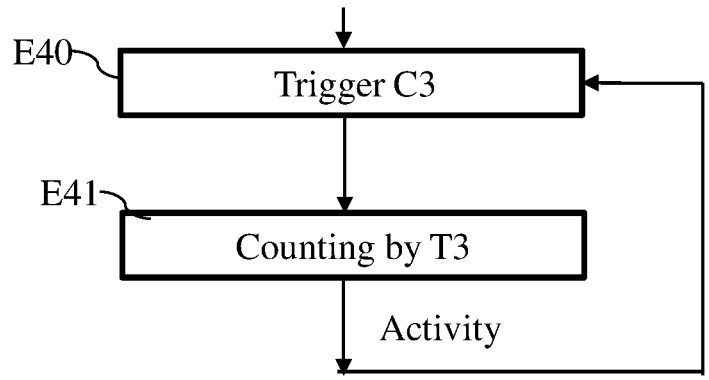
FIG. 4 shows a state diagram of an algorithm executed by each data transmission device according to the present invention.
Figure 5:
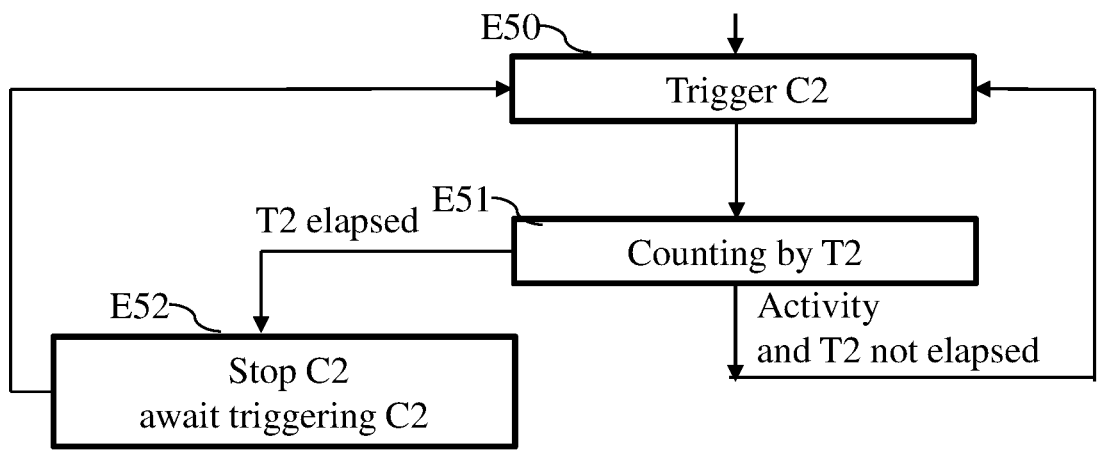
FIG. 5 shows a state diagram of an algorithm executed by each data transmission device according to the present invention.

All or part of the method described in relation to FIGS. 3 to 5 can be implemented in software form by executing a set of instructions by a programmable machine, such as a DSP (digital signal processor) or a microcontroller or be implemented in hardware form by a machine or a dedicated component, such as an FPGA (field-programmable gate array) or an ASIC (application-specific integrated circuit).

FIG. 3 shows an example of a state diagram of an algorithm executed by each data transmission device according to the present invention.

The state E30 corresponds to a state of initialisation of the data transmission device.

In the state E30, the initialisation variable Init is set to the value 1, and the final value T1 of a first counter C1, the final value T2 of a second counter C2 and the final value T3 of a third counter C3 are loaded into the counters C1, C2 and C3.

The final value T1 of the first counter C1 is identical for each data transmission device. The first counter C1 is a counter that is not reinitialised and retriggered whenever the presence of data is detected on the radio medium but is a counter that is forced to the final value if the presence of data is detected on the radio medium during the counting, as will be explained hereinafter. For example, the final value T1 of the counter C1 is equal to 16 milliseconds.

For example, the final value T1 is higher than the sum for i=1 to N of the transmission times of the frames plus the sum for i=1 to N of the final values of the counters T3 plus the final value T2, where N is the maximum number of data transmission devices.

The final value T2 of the second counter C2 is identical for each data transmission device. The counter C2 is a counter that is reinitialised to an initial value and if the counter C2 has not arrived at its final value T2, i.e. at the elapsed state; in this case its retriggering, i.e. the retriggering of C2, no longer depends on the detection of the presence of data on the radio medium, but on an explicit action of triggering the second counter C2.

The final value T2 of the counter C2 is higher than the maximum final value T3 that the value of the third counter C3 can take. For example, the value of the counter SG is equal to three milliseconds.

The final value T3 of the third counter C3 is different for each data transmission device. The counter C3 is a counter that is reinitialised to an initial value and retriggered whenever the presence of data is detected on the radio medium. The final value T3 of the counter C3 is defined for example when the data transmission device is installed. The final value T3 of the counter C3 is, according to another example, determined by the data transmission device from its unique identifier and from a table associating a different value of T3 with each data transmission device identifier. For example, the final value of the counter C3 is equal to 1, 1.5, 2, 2.5 . . . milliseconds.

When the initialisation state E30 has ended, the transmission device passes to the state E31.

In the state E31, the data transmission device triggers the second counter C2 as from an initial value, for example 0, and the second counter C2 begins counting until the second counter C2 reaches its final value T2.

When the second counter C2 has reached its final value T2, the data transmission device passes to the state E32 if the variable Init is at the value 1 or passes to the step E33 if the variable Init is at the value 0.

In the state E32, the data transmission device sets the variable Init to the value 0 and triggers the first counter C1 as from an initial value, for example 0, and the first counter C1 begins to count.

If during the counting of the first counter C1 a presence of data on the radio medium is detected, the transmission device passes to the state E35.

If during the counting of the first counter C1, no presence of data on the radio medium is detected, the transmission device passes to the state E33 when the first counter C1 has reached its final value T1.

In the state E35, the data transmission device triggers the third counter C1 as from an initial value, for example 0, the third counter C3 begins counting and the first counter is forced to its final value T1. The transmission device passes to the following state E36.

In the following state E36, the data transmission device waits until the third counter C1 has arrived at its final value T3 and passes to the state E34 when the third counter C3 has arrived at its final value T3.

In the state E33, the data transmission device triggers the third counter C3 as from an initial value, for example 0, the third counter C3 begins to count and the transmission device waits until the third counter C3 has arrived at its final value T3 in order to pass to the state E34.

In the state E34, the data transmission device demands the transfer of one or more data frames on the radio medium and triggers the first counter C1 as from an initial value, for example 0.

For example, the data transmission device transfers a data frame coming from the equipment with which it is associated and/or at least one data frame previously sent by at least one other transmission device on the radio medium, thus fulfilling the function of repeater for one or more other transmission devices.

Once these operations have been performed, the data transmission device returns to the previously described state E31.

FIG. 4 shows a state diagram of an algorithm executed by each data transmission device according to the present invention.

FIG. 4 shows the reinitialisation of the third counter to an initial value and retriggered whenever the presence of data is detected on the radio medium.

In the state E40, the data transmission device triggers the third counter C3 as from an initial value, for example 0.

In the following state E41, the third counter C3 begins to count.

If the presence of data on the radio medium is detected during the counting, the data transmission device returns to the state E40.

FIG. 5 shows a state diagram of an algorithm executed by each data transmission device according to the present invention.

FIG. 5 shows the reinitialisation of the second counter C2 to an initial value and retriggered whenever the presence of data is detected on the radio medium.

In the state E50, the data transmission device triggers the second counter C2 as from an initial value, for example 0.

In the following state E51, the second counter C2 begins to count.

If the presence of data on the radio medium is detected during the counting of the second counter C2, the data transmission device returns to the state E50.

If no data has been detected on the radio medium during the counting up to the final value T2 of the second counter C2, the data transmission device passes to the state E52.

In the state E52, the data transmission device stops the second counter C2 and awaits a new triggering of the second counter C2 in order to return to the state E50.

Figure 6:
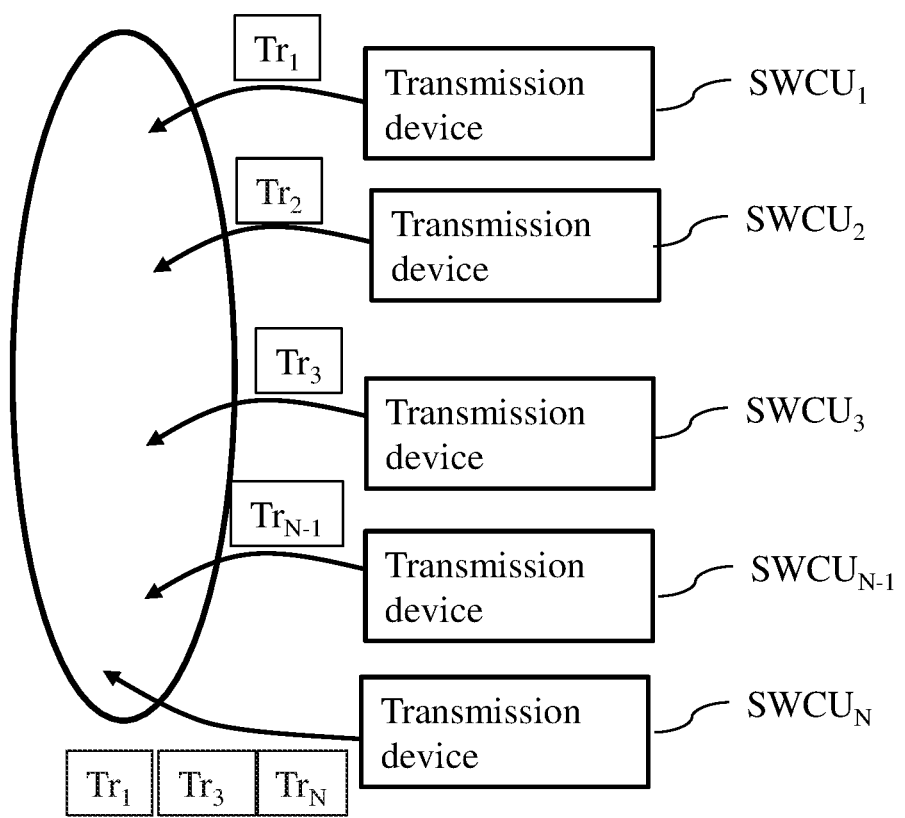
FIG. 6 illustrates the repeater function that one or more data transmission devices implement according to a particular embodiment of the present invention.

FIG. 6 illustrates the repeater function that one or more data transmission devices implement according to a particular embodiment of the present invention.

In the example in FIG. 6, the data transmission device $SWCU_1$ is the first to send a data frame, the data transmission device $SWCU_2$ is the second to send a data frame, the data transmission device $SWCU_3$ is the third to send a data frame, the data transmission device $SWCU_{N-1}$ is the $N-1^{th}$ to send a data frame and the data transmission device $SWCU_N$ is the $N^{th}$ to send a data frame.

In the example in FIG. 6, the data transmission device $SWCU_1$ transfers a data frame $Tr_1$ coming from the equipment with which it is associated, the data transmission device $SWCU_2$ fulfils the function of repeater for the data frame $Tr_1$ sent by the data transmission device $SWCU_1$, the data transmission device $SWCU_3$ transfers a data frame $Tr_3$ coming from the equipment with which it is associated, the data transmission device $SWCU_{N-1}$ transfers a data frame $Tr_{N-1}$ coming from the equipment with which it is associated and the data transmission device $SWCU_N$ fulfils the function of repeater for the data frames $Tr_1$ and $Tr_3$ sent by the data transmission devices $SWCU_1$ and $SWCU_3$ as well as the transfer of a data frame coming from the equipment with which it is associated.

The invention claimed is:

1. A method for transmitting data in a carrier sense multiple access wireless network wherein a plurality of data transmission devices respectively send at least one data frame at different moments from each other, wherein the method causing, by each transmission device when the transmission device is initialised, to perform:
    loading a final value of a first counter, a final value of a second counter and a final value of a third counter, the final value of the first counter being identical for all the data transmission devices, the final value of the second counter being identical for all the data transmission devices and the final value of the third counter being different from each final value of the third counter of the other data transmission devices, the first, second and third counters having an initial value;
    triggering the second counter as from its initial value, the second counter being reinitialised to its initial value,
    when the second counter has arrived at its final value, triggering the first counter as from its initial value, the first counter being forced to its final value whenever the presence of data is detected on the medium if the second counter has arrived at its final value,
    when the first counter has arrived at its final value, triggering the third counter as from its initial value, the third counter being reinitialised to its initial value and retriggered whenever the presence of data is detected on the radio medium,
    transferring at least one data frame, when the first counter has arrived at its final value, and triggering the first counter as from its initial value.

2. The method according to claim 1, wherein the method causes, after the initialisation of the transmission device, the transmission device to perform:
    triggering the second counter as from its initial value, the second counter being reinitialised to its initial value,
    when the second counter has arrived at its final value, triggering the third counter as from its initial value, the third counter being reinitialised to its initial value and retriggered whenever the presence of data is detected on the radio medium,
    transferring at least one data frame, when the third counter has arrived at its final value, and triggering of the first counter as from its initial value, the first counter being forced to its final value whenever the presence of data is detected on the medium during the counting by the third counter.

3. The method according to claim 2, wherein each data transmission device is associated with an item of equipment and a transferred frame comes from the equipment associated with the transmission device and/or at least one transferred frame was previously transferred by at least one other data transmission device.

4. The method according to claim 1, wherein the final value of the second counter is higher than the maximum value that the final value of each third counter can take.

5. The method according to claim 1, wherein the first final value is higher than the sum for i=1 to N of the transmission times of the frames plus the sum for i=1 to N of the final values of the third counters T3 plus the second final value, where N is the maximum number of data transmission devices.

6. A system for transmitting data in a carrier sense multiple access wireless network wherein a plurality of data transmission devices respectively send at least one data frame at different moments from each other, wherein each device comprises circuitry, used when the transmission device is initialised, causing the transmission device to perform:
  loading a final value of a first counter, a final value of a second counter and a final value of a third counter, the final value of the first counter being identical for all the data transmission devices, the final value of the second counter being identical for all the data transmission devices and the final value of the third counter being different from each final value of the third counter of the other data transmission devices, the first, second and third counters having an initial value;
  triggering the second counter as from its initial value, the second counter being reinitialised to its initial value,
  when the second counter has arrived at its final value, triggering the first counter as from its initial value, the first counter being forced to its final value whenever the presence of data is detected on the medium during the counting by the first counter,
  when the first counter has arrived at its final value, triggering the third counter as from its initial value, the third counter being reinitialised to its initial value and retriggered whenever the presence of data is detected on the radio medium if the second counter has arrived at its final value,
  transferring at least one data frame, when the third counter has arrived at its final value, and triggering of the first counter as from its initial value.

7. The system according to claim 6, wherein each device comprises circuitry used when the transmission device is initialised, for:
  triggering the second counter as from its initial value, the second counter being reinitialised to its initial value,
  when the second counter has arrived at its final value, triggering the third counter as from its initial value, the third counter being reinitialised to its initial value and retriggered whenever the presence of data is detected on the radio medium,
  transferring at least one data frame, when the third counter has arrived at its final value, and triggering the first counter as from its initial value, the first counter being forced to its final value whenever the presence of data is detected on the medium during the counting by the third counter.

8. The system according to claim 6, wherein the data transmission devices are included in an aircraft.

9. The system according to claim 6, wherein each data transmission device is associated with an item of equipment and a transferred frame comes from the equipment associated with the transmission device and/or at least one transferred frame was previously transferred by at least one other data transmission device.

10. A computer program stored on an information carrier, the program comprising instructions for implementing the method according to claim 1, when it is loaded into and executed by a data transmission device.

11. A non-transitory storage medium configured to store a computer program comprising instructions for implementing, by a data transmission device, the method according to claim 1, when the program is executed by a processor of the data transmission device.

* * * * *